United States Patent
Fang et al.

(10) Patent No.: US 8,030,892 B2
(45) Date of Patent: Oct. 4, 2011

(54) PHONE CHARGING STAND

(75) Inventors: Ting-Yuan Fang, Taipei (TW); Bellring Sheng, Taipei (TW); Jung-Chung Wang, Taipei (TW); Yi-Rui Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 498 days.

(21) Appl. No.: 12/178,959

(22) Filed: Jul. 24, 2008

(65) Prior Publication Data

US 2009/0051319 A1      Feb. 26, 2009

(30) Foreign Application Priority Data

Aug. 21, 2007   (TW) ............................... 96130945 A

(51) Int. Cl.
*H02J 7/00* (2006.01)
(52) U.S. Cl. ...................................... 320/115; 320/113
(58) Field of Classification Search .................. 320/115, 320/113
See application file for complete search history.

(56) References Cited

U.S. PATENT DOCUMENTS

| | | | |
|---|---|---|---|
| 5,371,784 A | 12/1994 | Yankura | |
| 5,982,884 A * | 11/1999 | Hoffmann | ..................... 379/446 |
| 6,043,626 A | 3/2000 | Snyder et al. | |
| 6,285,166 B1 | 9/2001 | Cannon | |
| 6,344,727 B1 | 2/2002 | Desai et al. | |
| 6,597,152 B1 * | 7/2003 | Jacobs et al. | ................... 320/113 |
| 2004/0097127 A1 | 5/2004 | Smith et al. | |
| 2006/0238164 A1 | 10/2006 | Rosal et al. | |
| 2007/0142079 A1 | 6/2007 | Kumar | |

FOREIGN PATENT DOCUMENTS

| | | |
|---|---|---|
| CN | 1215523 A | 4/1999 |
| EP | 1 126 377 A2 | 8/2001 |
| TW | M263555 | 5/2005 |
| TW | I255572 | 5/2006 |

* cited by examiner

*Primary Examiner* — M'Baye Diao
(74) *Attorney, Agent, or Firm* — Muncy, Geissler, Olds & Lowe, PLLC

(57) ABSTRACT

A phone charging stand includes a casing and a cover. The casing has a socket on one surface to hold a phone, and a first universal serial bus (USB) connecting port on another surface of the casing is used to connect a wireless dongle having a USB interface. The cover is pivotally connected to one end of the casing. The cover can be rotated toward the socket to be attached to the casing to hold the phone. The cover can also be rotated toward the another surface of the casing to support the charging stand.

6 Claims, 6 Drawing Sheets

PHONE CHARGING STAND

CROSS-REFERENCE TO RELATED APPLICATIONS

This application claims priority to Taiwan Application Serial Number 96130945, filed Aug. 21, 2007, which is herein incorporated by reference.

BACKGROUND OF THE INVENTION

1. Field of the Invention

The invention relates to a phone charging stand and, more particularly, to a phone charging stand which is carried conveniently.

2. Description of the Related Art

Since a conventional phone charging stand is not thin enough, it is difficult to be carried together with a phone. When a user travels, he needs to carry a travel charger (usually consisting of a connecting cable and a transformer) to charge the phone during his travel. Therefore, the user needs to buy two types of phone chargers that occupy much space. It is inconvenient for a modern person to manage a plurality of travel chargers or charging stands of portable electronic products.

BRIEF SUMMARY OF THE INVENTION

The objective of the invention is to provide a phone charging stand.

To achieve the above objective of the invention, a phone charging stand is provided. The phone charging stand includes a casing and a cover. The casing has a socket for holding a phone on its one surface and a first universal serial bus (USB) connecting port for connecting a wireless dongle having a USB interface on another surface. The cover is pivotally connected to one end of the casing. The cover can be rotated toward the socket to be attached to the casing further to hold the phone. The cover also can be rotated toward another surface of the casing to support the charging stand.

BRIEF DESCRIPTION OF THE DRAWINGS

The present invention will become more fully understood from the detailed description given hereinbelow and the accompanying drawings, which are given by way of illustration only, and thus are not limitative of the present invention

DETAILED DESCRIPTION OF THE PREFERRED EMBODIMENTS

From the above, the invention provides a charging stand which can be conveniently packed away and carried. The charging stand and a phone cooperating with the charging stand can be packed away and carried together, and the charging stand can hold a wireless dongle of the phone at the same time. The charging stand is illustrated in detail in the following embodiment.

Figure 1:
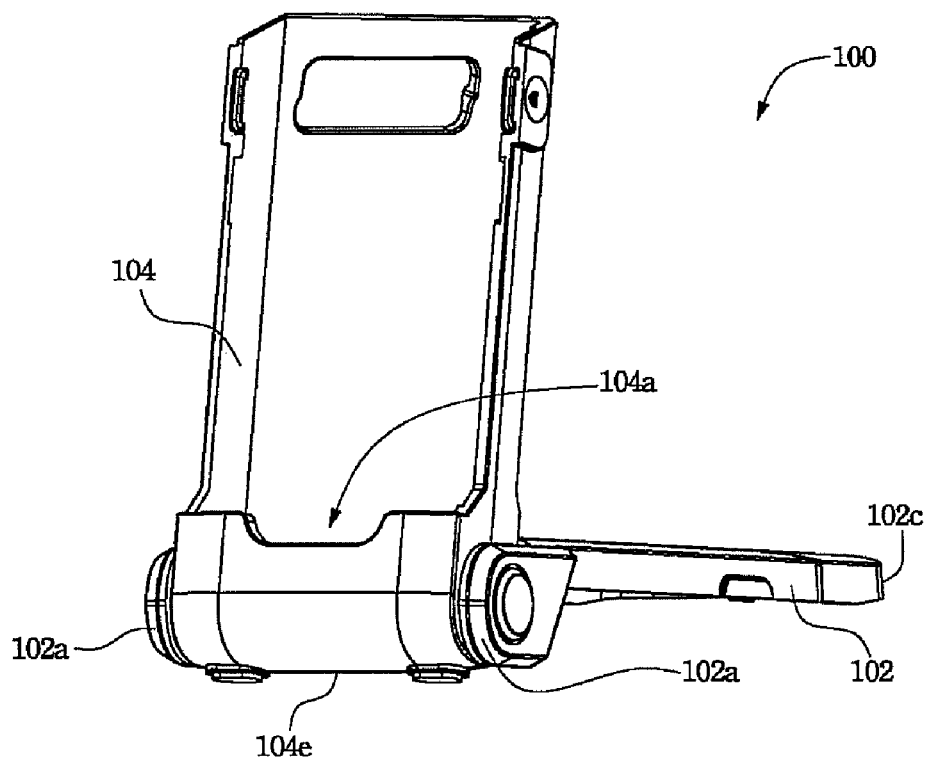
FIG. 1 and FIG. 2 are schematic diagrams showing a charging stand of a preferred embodiment of the invention.
Figure 2:
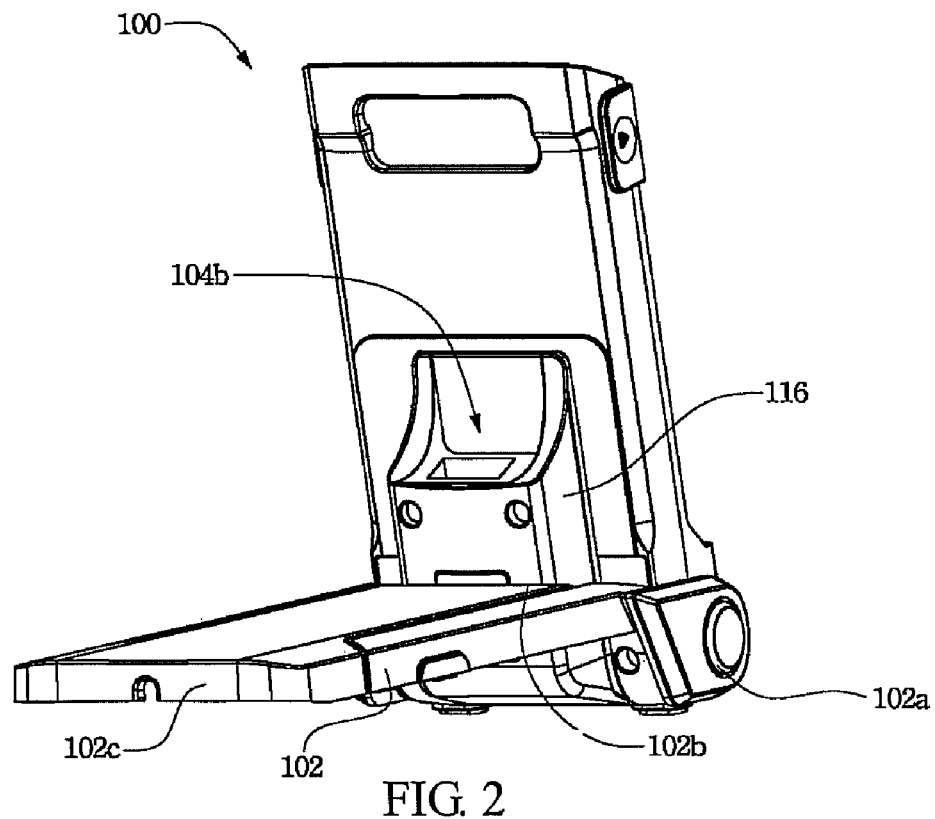

FIG. 1 and FIG. 2 are schematic diagrams showing a type of charging stand of an embodiment of the invention. The charging stand 100 mostly consists of a casing 104 and a cover 102. The front of the casing 104 has a socket 104a for placing a phone which needs to be charged. The socket 104a is provided with a charging electrode (not shown in FIG. 1 and FIG. 2) for being electrically connected to a phone which is charged. The back of the casing 104 has a universal serial bus (USB) connecting, port 104b for holding the wireless dongle of the phone. One side 102b of the cover 102 is pivotally connected to one side 104e of the casing 104, and therefore, the cover 102 can be rotated relatively to the casing 104. The cover 102 is pivotally connected to the side 104e of the casing 104 via a pair of connecting arms 102a extending from two ends of the side 102b. In the embodiment, the cover 102 can be rotated to the back of the casing 104 to allow the back of the casing 104 to lean against the side 102b of the cover 102, and then the side 104e of the casing 104 and another side 102c of the cover 102 are used as supporter to enable the charging stand 100 to stand on a supporting surface.

Figure 3:
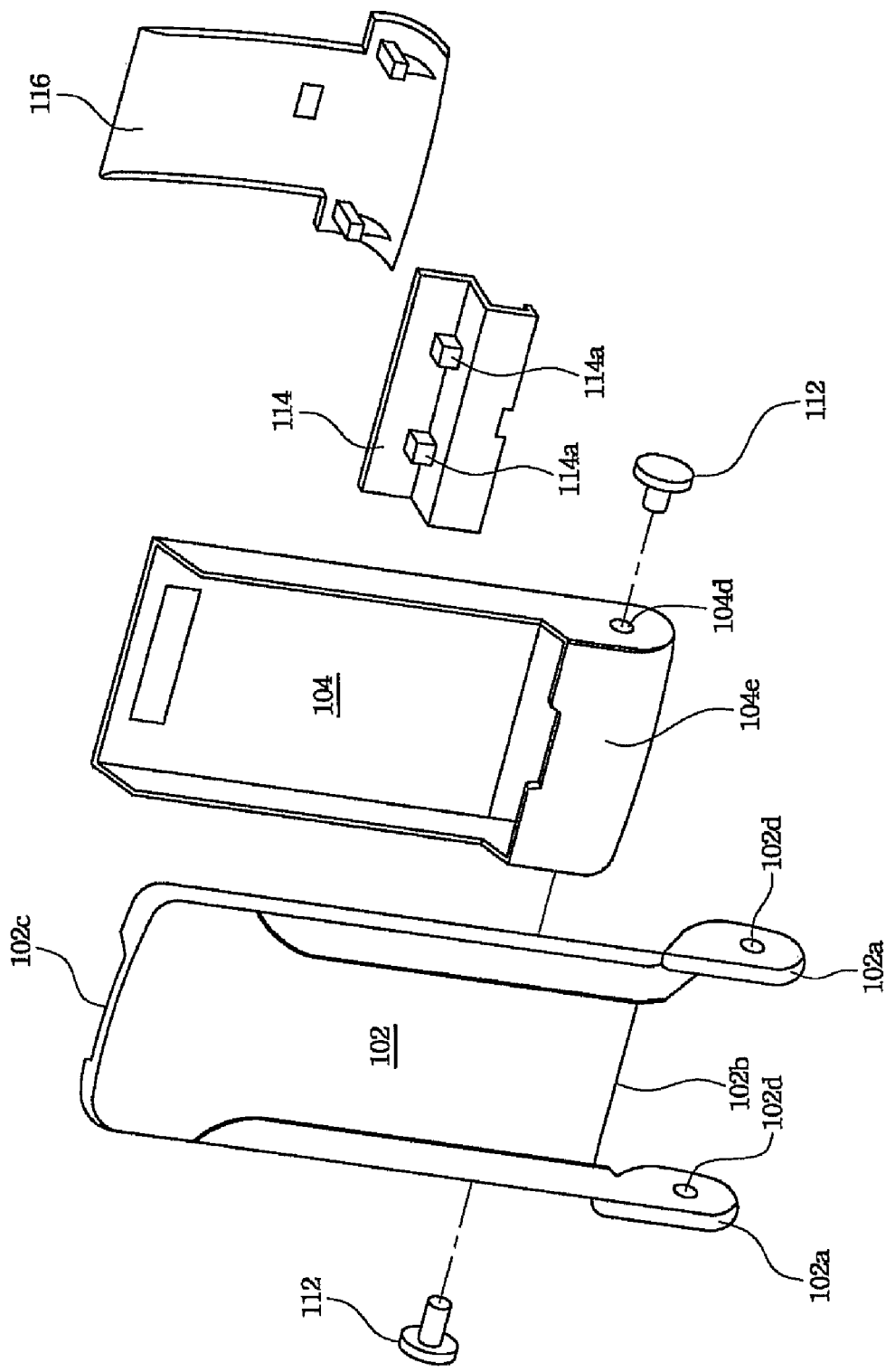
FIG. 3 is an exploded diagram showing a charging stand according to a preferred embodiment of the invention.

FIG. 3 is an exploded diagram showing a charging stand according to a preferred embodiment of the invention. The disassembled charging stand mostly includes the cover 102, the casing 104, a bottom casing 114 and a back casing 116. The mode of assembling the charging stand is described hereinbelow. Pivotal connecting holes 102d on the connecting arms 102a of the cover 102 are aligned with screw holes 104d on two ends of the side 104e of the casing 104 first, and then two screw shafts 112 pass through the pivotal connecting holes 102d and are screwed into the screw holes 104d. The bottom casing 114 has a pair of charging electrodes 114a. When the bottom casing 114 is fixed to the bottom of the casing 104, the charging electrodes 114a are located in the socket 104a of the casing 104. The back casing 116 is fixed to the bottom of the casing 104.

Figure 4:
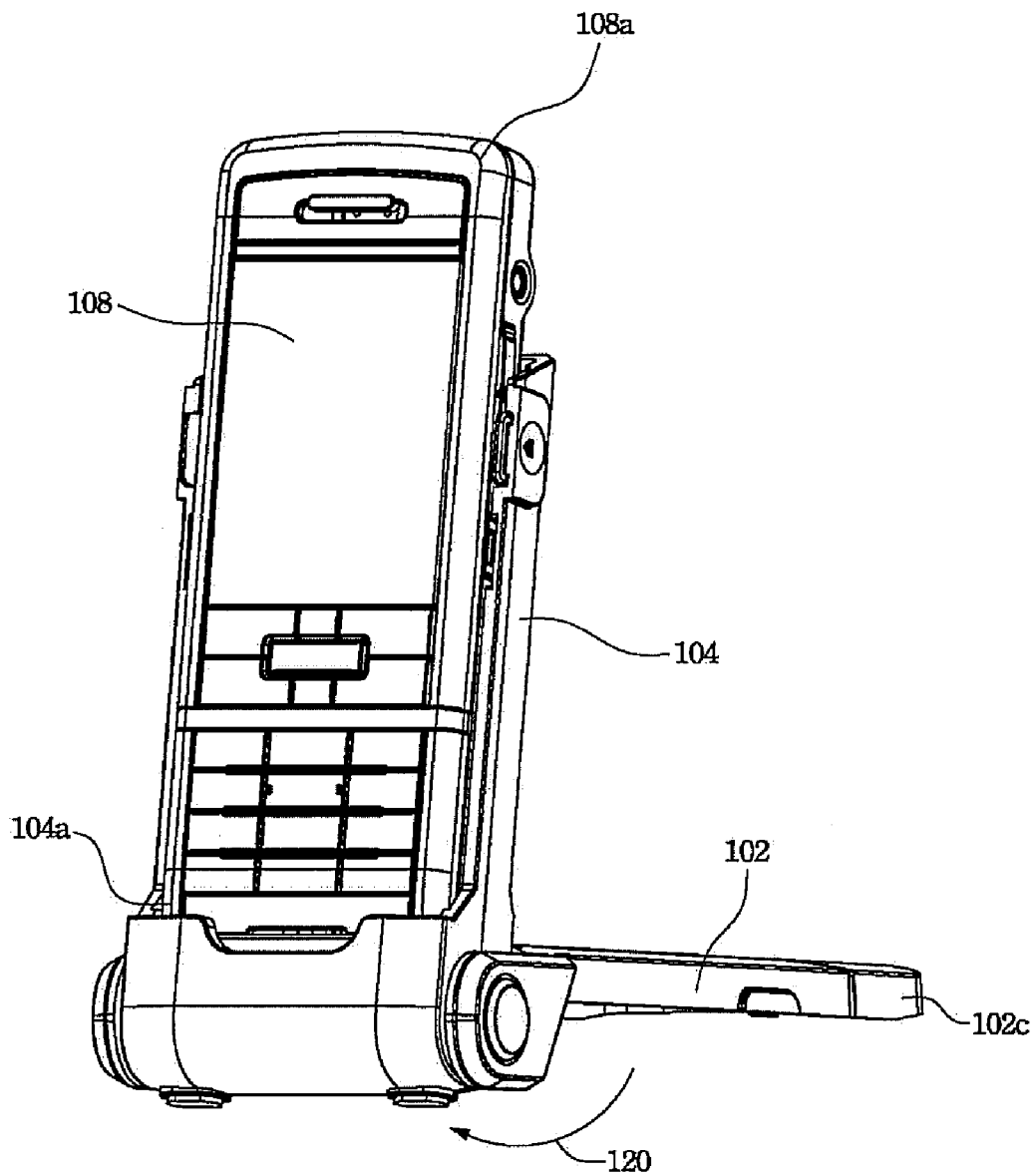
FIG. 4 and FIG. 5 are schematic diagrams showing a charging stand into which a phone is inserted according to a preferred embodiment of the invention.
Figure 5:
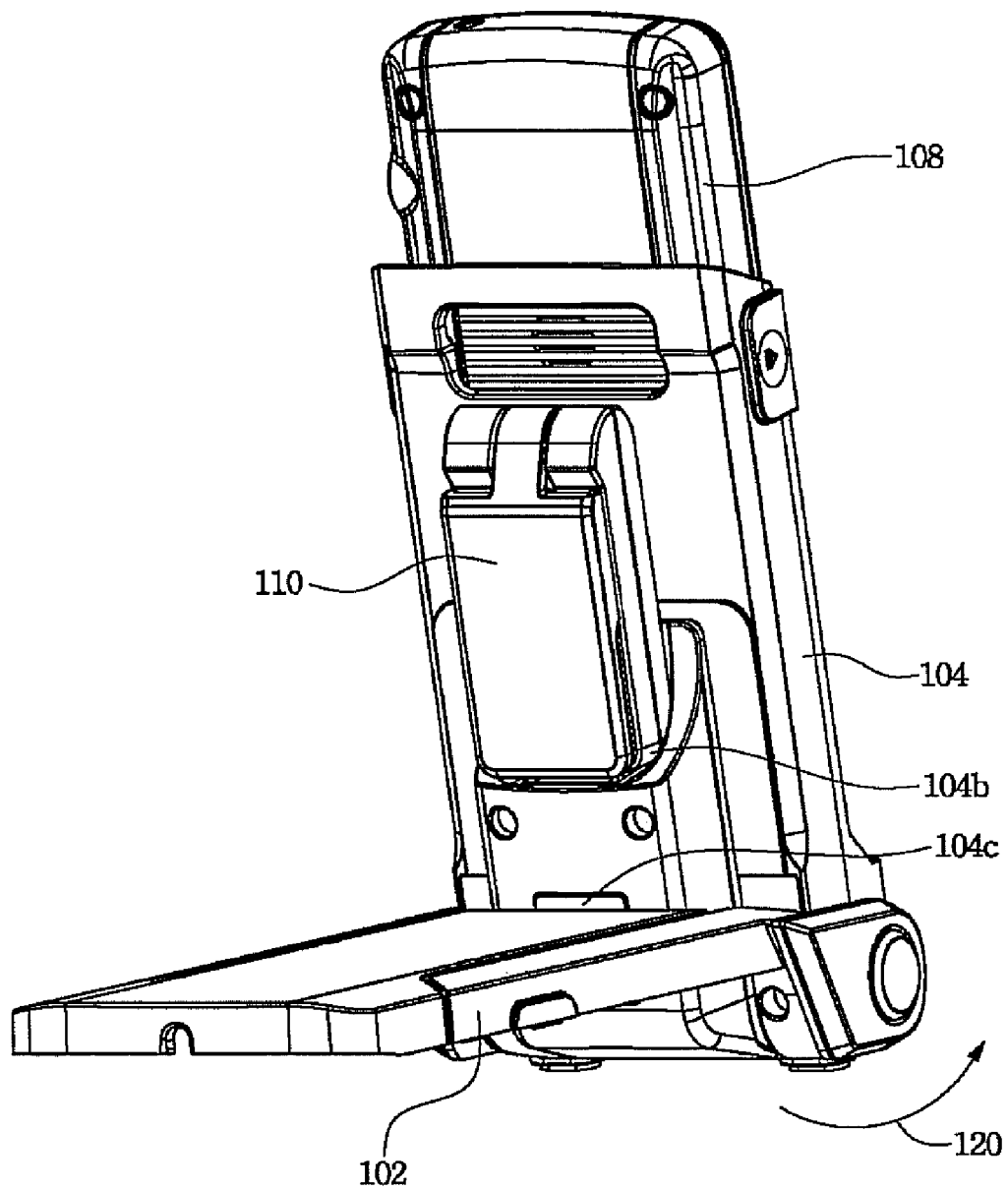
Figure 6:
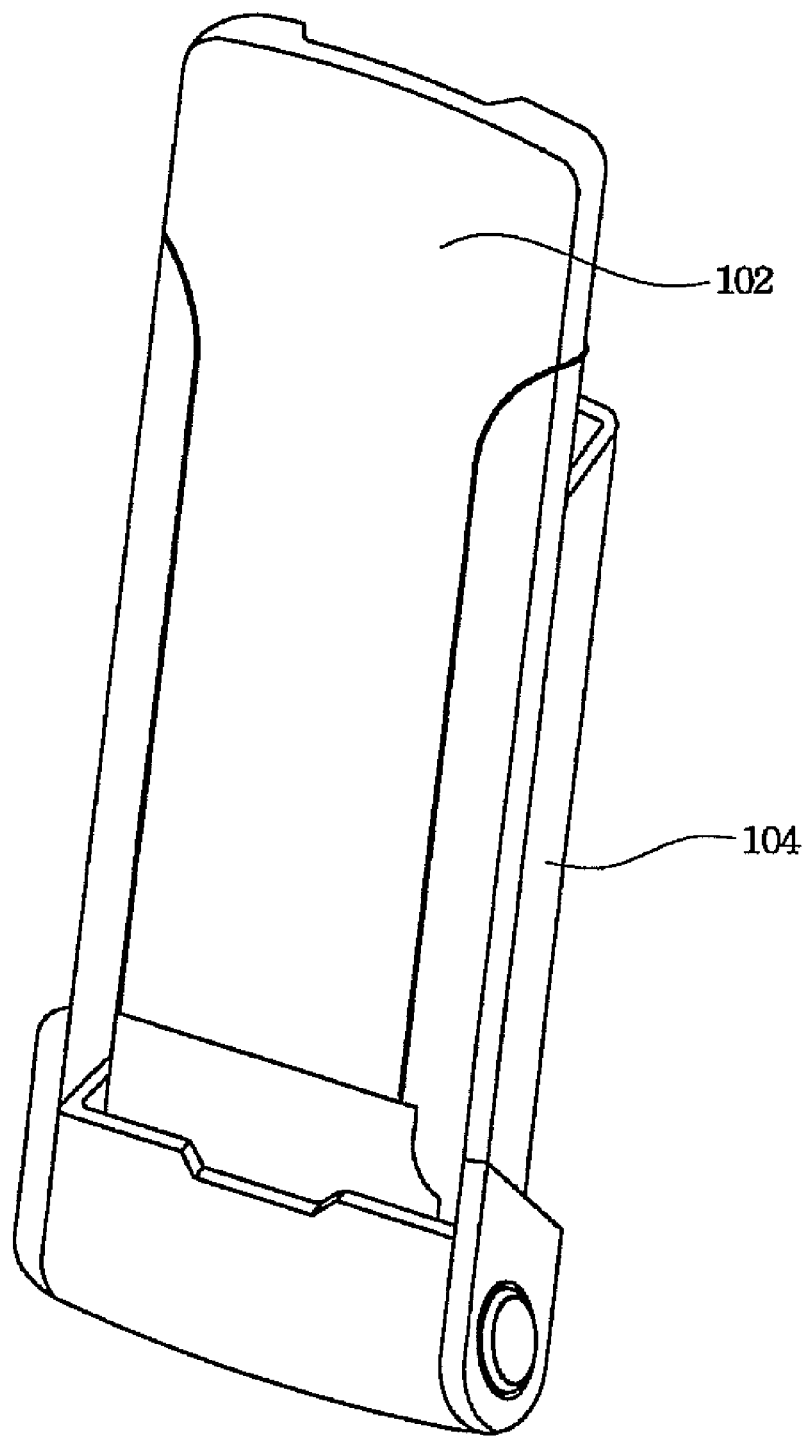
FIG. 6 and FIG. 7 are schematic diagrams showing a closed charging stand of a preferred embodiment of the invention.

FIG. 4 and FIG. 5 are schematic diagrams showing a charging stand into which a phone is inserted according to a preferred embodiment of the invention. In FIG. 4, a phone 108 is inserted into the socket 104a at the front of the casing 104, and the bottom of the phone 108 is connected to the charging electrodes 114a (as shown in FIG. 3) in the socket 104a. The cover 102 can be rotated along a direction 120 to the front of the casing 104 further to be attached to the casing 104, and then the phone 108 is held between the cover 102 and the casing 104 (as shown in FIG. 6). One side 102c of the cover 102 can cover the top side 108a of the phone 108. In other words, the cover 102 has enough length to cover the whole phone 108, and then the phone 108 cannot slide out of the charging stand. In FIG. 5, a universal serial bus (USB) (interface) wireless dongle 110 of the phone 108 is inserted into the USB connecting port 104b at the back of the casing 104, and then the wireless dongle 110 and the casing 104 can be carried together. The state in which the cover 102 is rotated along the direction 120 to the front of the casing 104 to be attached to the casing 104 is shown in FIG. 7.

Figure 7:
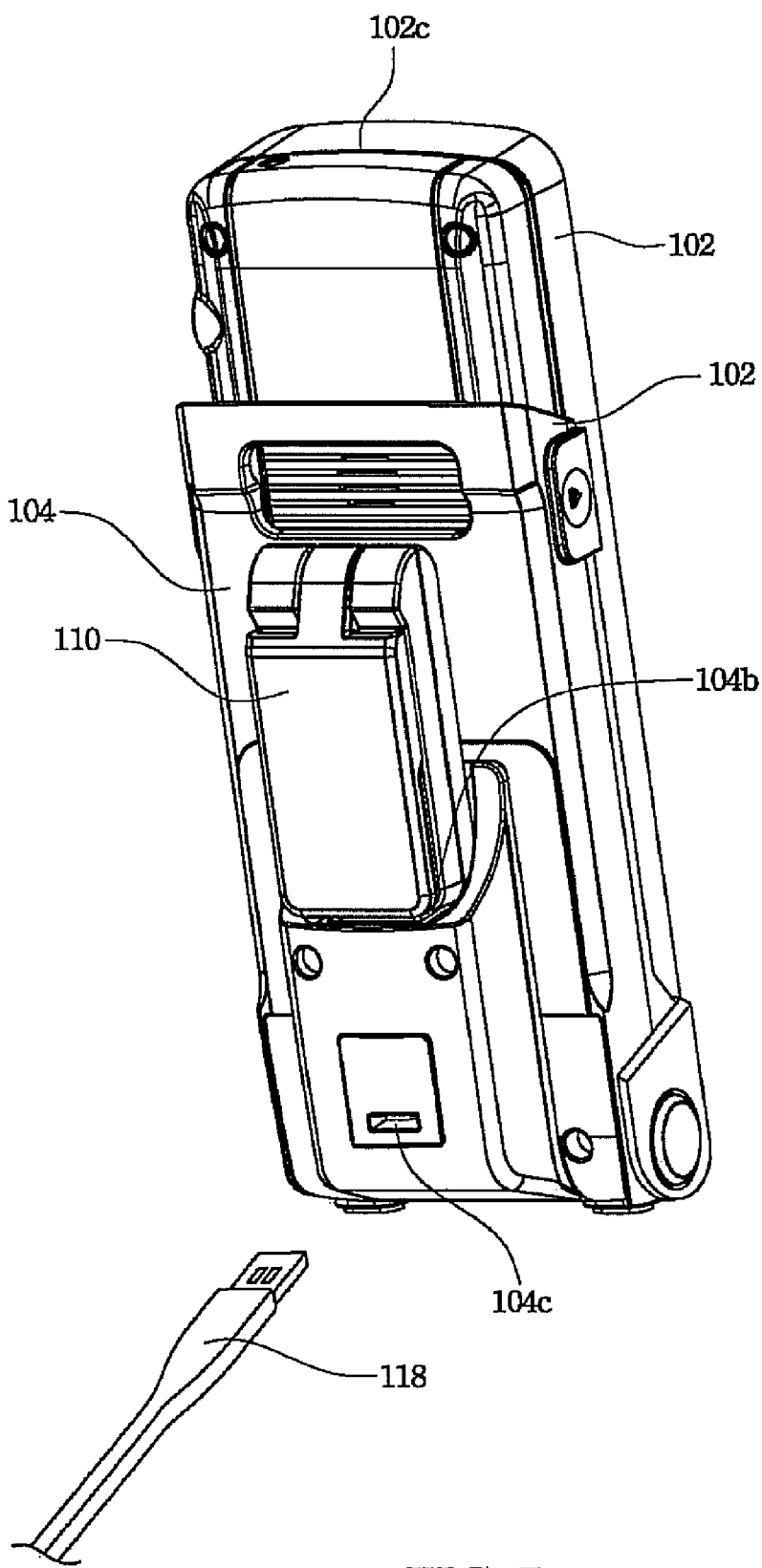

In FIG. 7, the back of the casing 104 has a USB connecting port 104b and a USB connecting port 104c which are electrically connected to each other. The USB connecting port 104c can be connected to a computer system (not shown) via a USB connecting wire 118. The USB connecting wire 118 is used to transmit electric power to the charging electrode 114a from the computer system, and it is used as a communication path between the USB (interface) wireless dongle 110 and the computer system. When the USB wireless dongle 110 is inserted into the USB connecting port 104b or a USB connecting port of a computer system, the phone 108 can transmit signals to or receive signals from the USB wireless dongle 110 and utilize instant messaging software such as Skype or MSN messenger to communicate with other devices via the Internet connected to the computer system.

As for the phone charging stand of the preferred embodiment of the invention, via the rotation of the cover relative to the casing, the charging stand can stand at a supporting surface and can be carried together with a phone cooperating with the charging stand. No matter whether the USB wireless dongle is inserted into the USB connecting port of the charging stand or the USB connecting port of the computer system, the phone 108 and the USB wireless dongle can transmit signals to each other, and then the phone 108 can communicate with other devices.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A phone charging stand comprising:

a casing having a socket for holding a phone and a first universal serial bus (USB) connecting port for being connected to a wireless dongle having a USB interface, wherein the socket is at one surface of the casing, and the first universal serial bus connecting port is at another surface of the casing; and a cover pivotally connected to one end of the casing, wherein the cover is capable of being rotated toward the socket to sandwich the phone between the cover and the casing, and the cover also is capable of being rotated toward another surface of the casing to support the phone charging stand.

2. The phone charging stand according to claim 1 further comprising a second USB connecting port which is located at the another surface of the casing and is electrically connected to the first USB connecting port.

3. The phone charging stand according to claim 1, wherein the cover further comprises a pair of connecting arms which extend from two sides of the cover to be pivotally connected to the casing.

4. The phone charging stand according to claim 3 further comprising a USB connecting wire for connecting the second USB connecting port to a computer system.

5. The phone charging stand according to claim 1 further comprising a charging electrode which is located in the socket.

6. The phone charging stand according to claim 1, when the cover is rotated to be attached to the casing, the cover has enough length to cover the whole phone.

* * * * *